(12) United States Patent
Zaike et al.

(10) Patent No.: US 9,926,002 B2
(45) Date of Patent: Mar. 27, 2018

(54) HOUSING STRUCTURE AND POWER STEERING APPARATUS

(71) Applicant: Showa Corporation, Gyoda-shi (JP)

(72) Inventors: Yasuhiro Zaike, Haga-gun (JP);
Yusuke Hamaguchi, Haga-gun (JP);
Yosuke Takebayashi, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 81 days.

(21) Appl. No.: 14/866,306

(22) Filed: Sep. 25, 2015

(65) Prior Publication Data
US 2016/0264171 A1  Sep. 15, 2016

(30) Foreign Application Priority Data

Mar. 10, 2015  (JP) .................................. 2015-047442

(51) Int. Cl.
  *B62D 5/04* (2006.01)
  *F16H 57/039* (2012.01)
  *F16H 55/28* (2006.01)

(52) U.S. Cl.
  CPC ......... *B62D 5/0403* (2013.01); *B62D 5/0421* (2013.01); *F16H 57/039* (2013.01); *F16H 55/283* (2013.01)

(58) Field of Classification Search
  CPC ... B62D 5/0403; B62D 5/0421; F16H 57/039; F16H 55/283

(Continued)

(56) References Cited

U.S. PATENT DOCUMENTS 7,370,724 B2 *  5/2008  Saito ......................... B62D 1/16
                                                        180/444
9,446,786 B2 *  9/2016  Murakami ............... B62D 5/04
                    (Continued)

FOREIGN PATENT DOCUMENTS

CN      101111423 A    1/2008
CN      103906670 A    7/2014
           (Continued)

OTHER PUBLICATIONS

U.K. Search Report dated Mar. 21, 2016 for the corresponding U.K. Patent Application No. 1517122.6.

(Continued)

*Primary Examiner* — Jacob D Knutson
(74) *Attorney, Agent, or Firm* — Leason Ellis LLP

(57) ABSTRACT

A housing structure includes: a first housing having a fitting inner tubular portion that has an inner tubular end surface and a first bolt fastening portion that has a first bolt aligning surface formed at a position away from the inner tubular end surface in the radial direction, the first housing supporting a first end of an assist shaft via a first bearing; and a second housing having a fitting outer tubular portion having an outer tubular end surface and a second bolt fastening portion that has a second bolt aligning surface that mates with the first bolt aligning surface, the second housing supporting a second end of the assist shaft via a second bearing. A first gap is provided between the inner tubular end surface and an inner tubular opposite surface, and a second gap is provided between the outer tubular end surface and an outer tubular opposite surface.

7 Claims, 5 Drawing Sheets

(58) Field of Classification Search
USPC .................................................. 180/443, 444
See application file for complete search history.

(56) References Cited

U.S. PATENT DOCUMENTS

| | | | |
|---|---|---|---|
| 2006/0169525 A1* | 8/2006 | Saito | B62D 1/16 180/444 |
| 2008/0011538 A1* | 1/2008 | Saito | B62D 1/16 180/444 |
| 2009/0050399 A1 | 2/2009 | Segawa et al. | |
| 2015/0225011 A1 | 8/2015 | Ishii et al. | |
| 2015/0375775 A1 | 12/2015 | Ushio et al. | |
| 2016/0297470 A1* | 10/2016 | Yamasaki | B62D 5/0403 |

FOREIGN PATENT DOCUMENTS

| | | |
|---|---|---|
| DE | 102012101383 A | 8/2013 |
| EP | 1645781 A | 4/2006 |
| JP | 03-1760270 A | 7/1991 |
| JP | 10-236322 A | 9/1998 |
| JP | 2002-240723 A | 8/2002 |
| WO | WO-2015/001684 A | 1/2015 |

OTHER PUBLICATIONS

Office Action dated Feb. 2, 2018 for the corresponding Chinese Patent Application No. 201510700439.X.

* cited by examiner

HOUSING STRUCTURE AND POWER STEERING APPARATUS

CROSS-REFERENCE TO RELATED APPLICATIONS

This application claims the benefit of Japanese Patent Application JP 2015-047442, filed Mar. 10, 2015, the entire content of which is hereby incorporated by reference, the same as if set forth at length.

BACKGROUND ART

1. Technical Field

The present invention relates to a housing structure and a power steering apparatus.

2. Background Art

A conventional example of a housing structure for an electric power steering apparatus is described in Japanese Patent Application Laid-open No. H10-236322. Japanese Patent Application Laid-open No. H10-236322 describes a housing divided into a gear case (first housing) that houses a worm gear structure and that bears one end of an assist shaft such that the assist shaft is rotatable and a gear box (second housing) that houses a rack shaft meshing with a pinion on the assist shaft and that bears the other end of the assist shaft such that the assist shaft is rotatable. A fitting outer tubular portion is formed on the first housing, and a fitting inner tubular portion is formed on the second housing. The first housing and the second housing are integrated together by fitting the fitting inner tubular portion inside the fitting outer tubular portion and fastening the first housing and the second housing together using bolts. An outer tubular end surface (a surface orthogonal to the axis of the assist shaft) at a tip of the fitting outer tubular portion is brought into abutting contact with an outer tubular opposite surface of the second housing formed radially outside the fitting inner tubular portion. An O ring is interposed between the fitting inner tubular portion and the fitting outer tubular portion in order to seal the inside of the housings.

PATENT LITERATURE

[Patent Literature 1] Japanese Patent Application Laid-open No. H10-236322

Japanese Patent Application Laid-open No. H10-236322 employs a method of fitting together tubular portions, which are a fitting inner tubular portion and a fitting outer tubular portion. The reason for this is to precisely center the assist shaft borne across the first housing and the second housing. A housing structure with such a fitting inner tubular portion and a fitting outer tubular portion poses the following problem. For example, when the maximum steering turning operation is performed and the rack shaft is moved leftward or rightward bringing the rack shaft into abutting contact with a rack stopper not depicted in the drawings, a strong meshing reaction force is exerted between the rack on the rack shaft and the pinion on the assist shaft. The rack and the pinion are typically helical gears, and thus, the meshing reaction force causes a thrust load to act on the assist shaft. The thrust load is transmitted to the first housing.

If the fitting area between the fitting inner tubular portion and the fitting outer tubular portion is located away from bolt fastening portions, then due to the thrust load transmitted to the first housing, the fitting inner tubular portion and the fitting outer tubular portion are disadvantageously likely to be displaced with respect to each other in an axial direction. In particular, when the outer tubular end surface and the outer tubular opposite surface, which are in contact with each other, undergo a thrust load in a direction in which the surfaces temporarily separate from each other and then come into contact with each other again, an abnormal sound (stick-slip sound) may occur between the outer tubular end surface and the outer tubular opposite surface. Furthermore, since the O ring, which is an elastic body, is interposed between the fitting inner tubular portion and the fitting outer tubular portion, when the outer tubular end surface and the outer tubular opposite surface, which are in contact with each other, undergo a thrust load in a direction in which the surfaces push each other, the O ring may be elastically deformed to displace the fitting inner tubular portion and the fitting outer tubular portion with respect to each other in a radial direction. Then, an abnormal sound (stick-slip sound) may also occur between the outer tubular end surface and the outer tubular opposite surface.

SUMMARY OF THE INVENTION

The present invention has been developed in order to solve these problems. An object of the present invention is to provide a housing structure and a power steering apparatus that allow suppression of a possible abnormal sound at fitting portions of divisional housings.

To accomplish this object, an aspect of the present invention includes a housing structure comprising: a first housing having a fitting inner tubular portion that is formed around an axis of a shaft member and has an inner tubular end surface at a tip of the fitting inner tubular portion and a first bolt fastening portion that has a first bolt aligning surface formed at a position away from the inner tubular end surface in a radial direction of the shaft member, the first housing supporting a first end side of the shaft member via a first bearing, and a second housing that has a fitting outer tubular portion, into which the fitting inner tubular portion is fitted and which has a outer tubular end surface at a tip of the fitting outer tubular portion, and a second bolt fastening portion having a second bolt aligning surface that mates with the first bolt aligning surface, the second housing supporting a second end of the shaft member via a second bearing. A first gap is provided between the inner tubular end surface and an inner tubular opposite surface of the second housing that is positioned opposite to the inner tubular end surface in an axial direction of the shaft member, a second gap is provided between the outer tubular end surface and an outer tubular opposite surface of the first housing that is positioned opposite to the outer tubular end surface in the axial direction of the shaft member, and when, after a thrust load on the shaft member causes the fitting inner tubular portion and the fitting outer tubular portion to separate from each other in the axial direction, the fitting outer tubular portion return to a position at which the fitting inner tubular portion is fitted into the fitting outer tubular portion, the first gap prevents contact between the inner tubular end surface and the inner tubular opposite surface, and the second gap prevents contact between the outer tubular end surface and the outer tubular opposite surface.

According to the aspect of the present invention, the second gap is provided between the outer tubular end surface and the outer tubular opposite surface so as to avoid contact between the outer tubular end surface and the outer tubular opposite surface when the fitting inner tubular portion and the fitting outer tubular portion separate from each other and then return to each other in the axial direction due to the thrust load of the assist shaft. Similarly, the first gap is provided between the inner tubular end surface and the inner tubular opposite surface so as to avoid contact between the inner tubular end surface and the inner tubular opposite surface. Thus, a possible abnormal sound between the fitting inner tubular portion and the fitting outer tubular portion can be avoided.

Furthermore, in the aspect of the present invention, the second gap is formed by positioning the outer tubular opposite surface on same plane as the first bolt aligning surface and positioning the outer tubular end surface so that the second end of the shaft member is closer from the outer tubular end surface than from the second bolt aligning surface.

Additionally, the second gap is formed by positioning the outer tubular end surface on same plane as the second bolt aligning surface and positioning the outer tubular opposite surface so that the first end of the shaft member is closer from the outer tubular opposite surface than from the first bolt aligning surface.

In the aspect of the present invention, the second gap can be easily formed in an existing housing structure.

Furthermore, an aspect of the present invention includes a power steering device comprising the housing structure: the shaft member is an assist shaft to which a worm wheel driven by an assist motor is rotatably attached.

In the aspect of the present invention, a possible abnormal sound in a housing of an assist torque mechanism can be suppressed.

The aspect of the present invention allows provision of a high-grade power steering apparatus that allows suppression of a possible abnormal sound in the housing.

DESCRIPTION OF THE PREFERRED EMBODIMENTS

Figure 1:
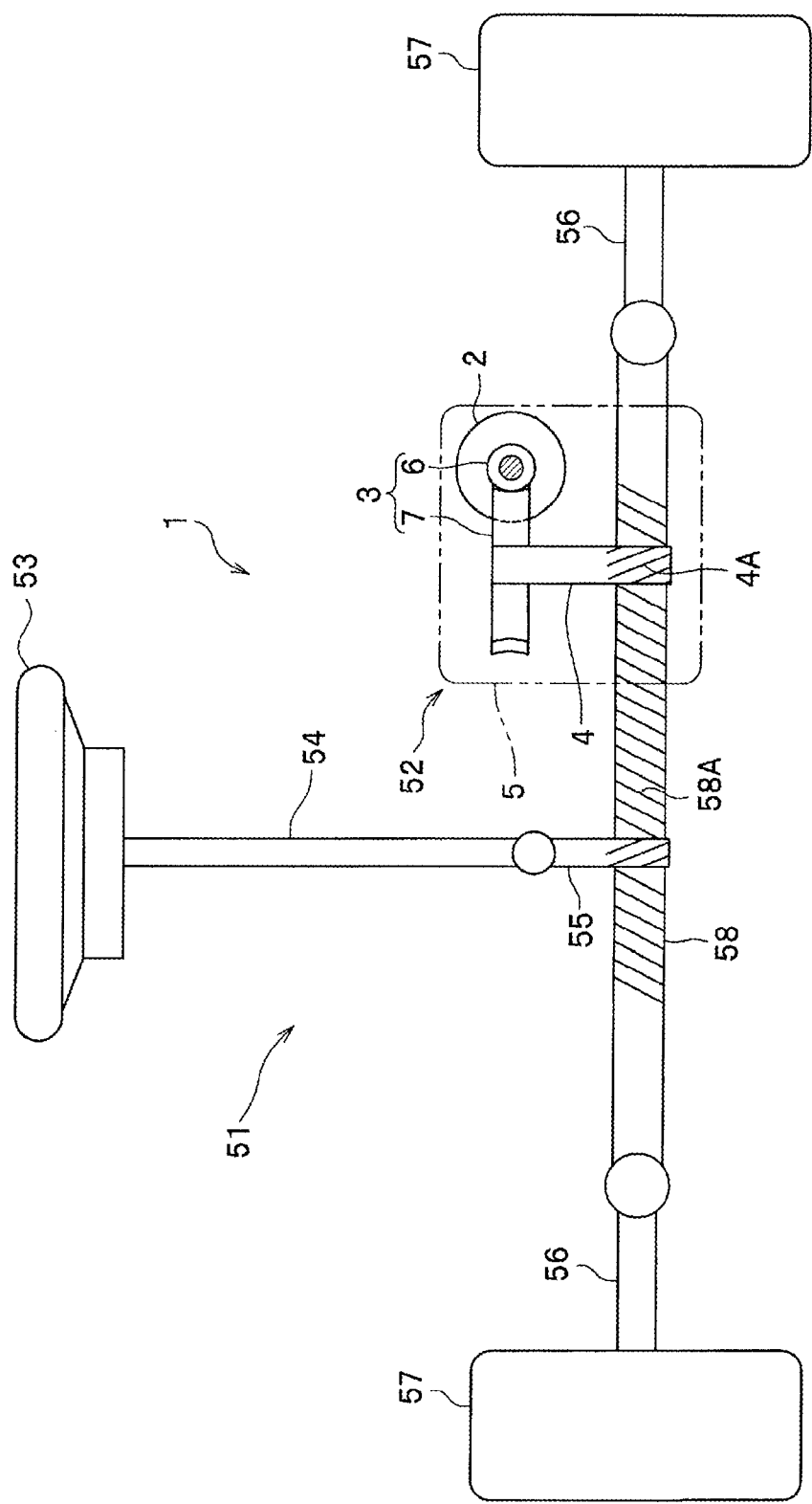
FIG. 1 is a schematic configuration diagram depicting an electric power steering apparatus.

In FIG. 1, an electric power steering apparatus 1 is a rack assist apparatus including a steering mechanism 51 having a rack shaft 58 extending in a lateral direction, and an assist torque mechanism 52 arranged at a first end of the rack shaft 58.

The steering mechanism 51 includes a steering wheel 53 operated by a driver, a steering shaft 54 that rotates in conjunction with operation of the steering wheel 53, a pinion shaft 55 provided below the steering shaft 54 via a torsion bar not depicted in the drawings, and a rack shaft 58 on which a rack 58A meshing with a pinion on the pinion shaft 55 is formed and to which left and right wheels 57 are coupled via tie rods 56. When the driver operates the steering wheel 53, the rack shaft 58 moves leftward or rightward to turn the wheels 57.

The assist torque mechanism 52 includes the rack shaft 58, an assist motor 2, a worm gear mechanism 3, an assist shaft (shaft member) 4 on which a pinion 4A meshing with a rack 58A on the rack shaft 58, and a housing 5 that covers the rack shaft 58, the worm gear mechanism 3, and the assist shaft 4. The worm gear mechanism 3 includes a worm 6 attached to the assist motor 2 and a worm wheel 7 that meshes with the worm 6. The worm wheel 7 is rotatably attached to the assist shaft 4. In the assist torque mechanism 52, a torque applied to the steering wheel 53 is detected by a torque sensor not depicted in the drawings. In accordance with the detected torque, the assist motor 59 is driven under control of a control apparatus not depicted in the drawings. Thus, the torque generated by the assist motor 59 is transmitted to the rack shaft 58 via the worm gear mechanism 3 and the assist shaft 4 as an assist force for the driver's operating force applied to the steering wheel 53.

A form in which the present invention is applied to the housing 5 will be described below.

Figure 2:
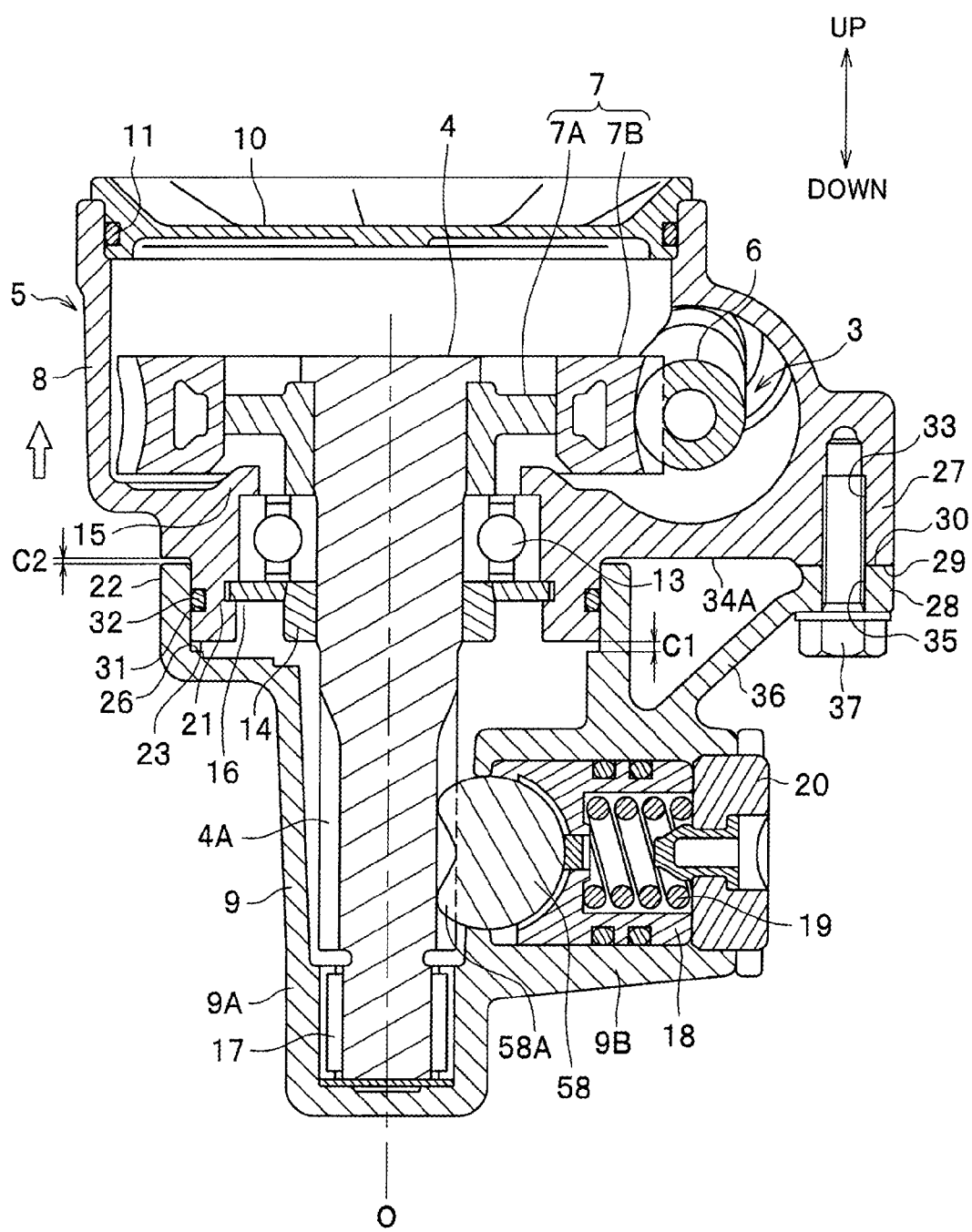
FIG. 2 is a sectional view depicting the structure of a housing and the interior of the housing.

In FIG. 2, the housing 5 is divided into a first housing 8 and a second housing 9. The first housing 8 is a housing that houses the worm gear mechanism 3 and that bears a part of the assist shaft 4 to which the worm wheel 7 of the worm gear mechanism 3 is attached such that the assist shaft 4 is rotatable, this part being close to an upper end (first end) of the assist shaft 4. The second housing 9 is a housing that houses the rack shaft 58 and that bears a part of the assist shaft 4 such that the assist shaft 4 is rotatable, this part being close to a lower end (second end) of the assist shaft 4.

The worm wheel 7 is attached to the upper end of the assist shaft 4. The worm wheel 7 includes an annular shaft portion 7A fixed to the upper end of the assist shaft 4 by press-in or the like and a gear portion 7B integrally attached to an outer periphery of the annular shaft portion 7A. The pinion 4A is formed on the assist shaft 4 so as to extend from substantially the middle of the assist shaft 4 to a part of the assist shaft 4 close to the lower end thereof in the direction of an axis O.

First Housing 8

The first housing 8 has a fitting inner tubular portion 21 formed around the axis O of the assist shaft 4 and having an annular inner tubular end surface 23 at a lower end (tip) of the fitting inner tubular portion 21, and a first bolt fastening portion 27 with a first bolt aligning surface 29 formed away from the inner tubular end surface 23 in a radial direction of the axis O. The inner tubular end surface 23 and the first bolt aligning surface 29 are formed along a surface orthogonal to the axis O.

The first housing 8 is shaped generally like a cylinder having a cylindrical axial direction coinciding generally with the axis O of the assist shaft 4 and also having a housing space for the worm wheel 7. A part of the first housing 8 is formed to bulge in a radial direction thereof so as to house the worm 6. The worm 6 and the worm wheel 7 are helical gears. Openings are formed at respective opposite ends of the first housing 8 in the cylindrical axial direction. The lower opening is formed as the fitting inner tubular portion 21 such that the assist shaft 4 is inserted through the opening. The upper opening is closed by an end cap 10 via an O ring 11. The end cap 10 is fastened to the first housing 8 with a bolt not depicted in the drawings.

An upper end of the assist shaft 4 is borne by the first housing 8 via a first bearing 13. An inner ring of the first bearing 13 is positioned in the direction of the axis O by bringing one side surface of the inner ring into abutting contact with the annular shaft portion 7A of the worm wheel 7 and bringing the other side surface of the inner ring into abutting contact with an inner ring stopper 14. The inner ring stopper 14 is attached, for example, to an outer periphery of the assist shaft 4 by screw-threading. An outer ring of the first bearing 13 is positioned in the direction of the axis O by bringing one side surface of the outer ring into abutting contact with a positioning wall portion 15 formed on the first housing 8 and bringing the other side surface of the outer ring into abutting contact with an outer ring stopper 16. The outer ring stopper 16 is, for example, a retaining ring that is fitted into a groove in an inner peripheral surface of the fitting inner tubular portion 21.

On an outer wall surface of the first housing 8, an annular outer tubular opposite surface 25 (FIG. 3) facing, in the direction of the axis O, an outer tubular end surface 24 (FIG. 3) of a fitting outer tubular portion 22 is formed on an upper radially outer side of the fitting inner tubular portion 21. The outer tubular opposite surface 25 is formed along a surface orthogonal to the axis O. On an outer peripheral surface of the fitting inner tubular portion 21, a rectangular seal groove 31 is formed around the axis O. A seal member 32 such as an O ring is fitted into the seal groove 31.

Figure 4:
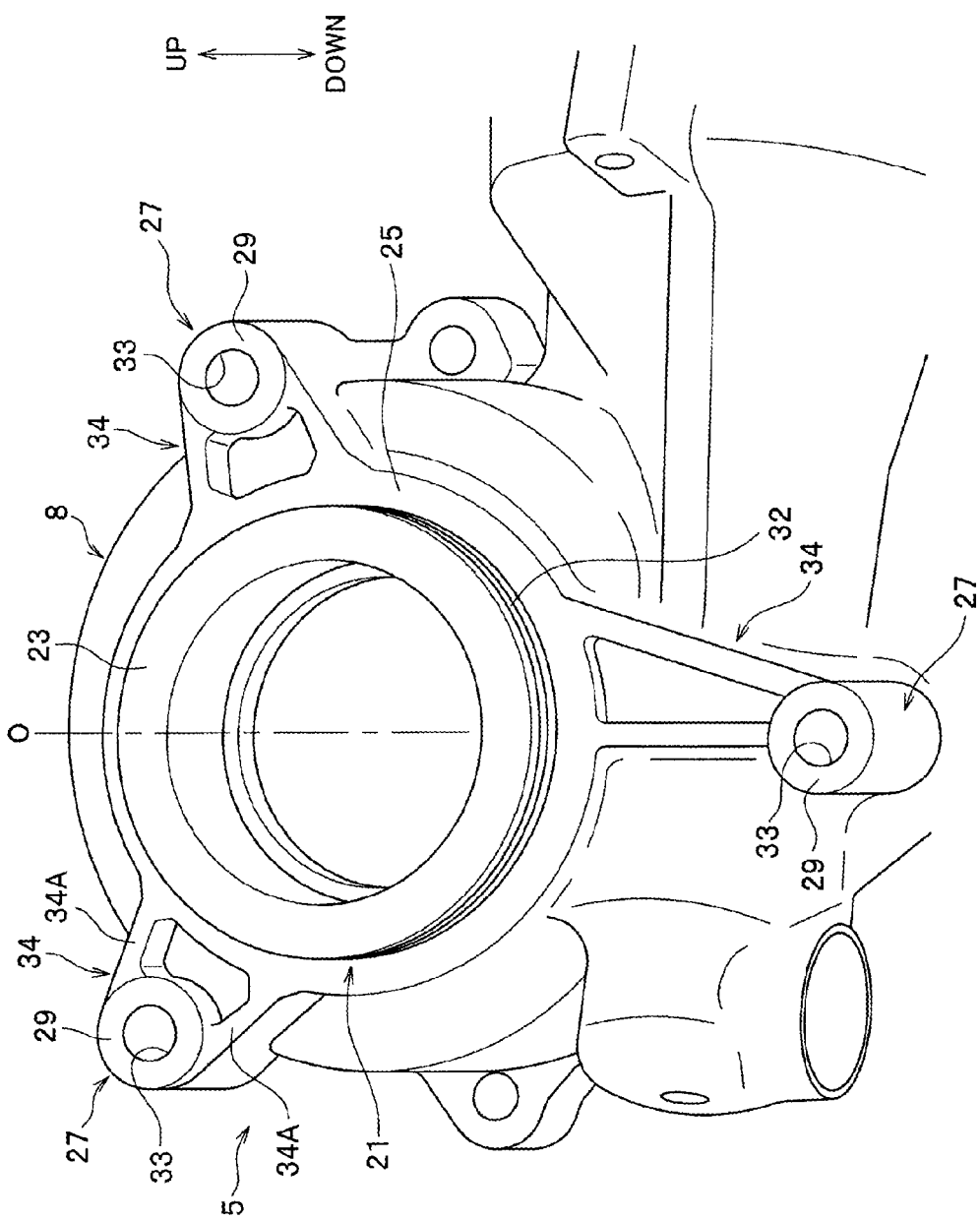
FIG. 4 is a perspective view of the appearance of a first housing.

As depicted in FIG. 4, a plurality of (in the present embodiment, three) the first bolt fastening portions 27 is formed on a radially outer side of the fitting inner tubular portion 21 at intervals in a circumferential direction approximately around the axis O. However, the first bolt fastening portions 27 need not be positioned on the same circumference. Each of the first bolt fastening portions 27 has an annular first bolt aligning surface 29 with an internal thread hole 33 formed in the center thereof. A rib 34 is formed between the outer tubular opposite surface 25 and the first bolt aligning surface 29. A lower end surface 34A of the rib 34 is positioned above the first bolt aligning surface 29. The outer tubular opposite surface 25 is formed on the same plane as the lower end surface 34A of the rib 34. In other words, the outer tubular opposite surface 25 is positioned above the first bolt aligning surface 29.

Second Housing 9

In FIG. 2, the second housing 9 has a fitting outer tubular portion 22 into which the fitting inner tubular portion 21 is fitted and which has an annular outer tubular end surface 24 (FIG. 3) at an upper end of the fitting outer tubular portion 22, and a second bolt fastening portion 28 with a second bolt aligning surface 30 that mates with the first bolt aligning surface 29. Both the outer tubular end surface 24 and the second bolt aligning surface 30 are formed along a surface orthogonal to the axis O.

The second housing 9 has a shape including a generally cylindrical assist shaft housing portion 9A that houses the assist shaft 4 approximately from the middle to the second end of the assist shaft 4 in the direction of the axis O and a rack shaft housing portion 9B formed to bulge from a part of the assist shaft housing portion 9A in the radial direction. The fitting outer tubular portion 22 into which the fitting inner tubular portion 21 of the first housing 8 is fitted is formed in an upper part of the assist shaft housing portion 9A.

A part of the assist shaft 4 at a position further toward a lower end side thereof than a range, where the pinion 4A is formed, is borne by the assist shaft housing portion 9A via a second bearing 17. The second bearing 17 is, for example, a needle bearing. A rear surface of the rack shaft 58 is constantly biased toward the assist shaft 4 by a coil spring 19 via a pressure pad 18. Thus, appropriate meshing engagement is maintained between the pinion 4A and the rack 58A. The coil spring 19 is in abutting contact with the pressure pad 18 at one end of the coil spring 19 and with a cap 20 attached to the rack shaft housing portion 9B, at the other end of the coil spring 19. The pressure pad 18 and the coil spring 19 are housed in the rack shaft housing portion 9B.

On an inner wall surface of the second housing 9, an annular inner tubular opposite surface 26 facing, in the direction of the axis O, the inner tubular end surface 23 of the fitting inner tubular portion 21 is formed on a lower radially inner side of the fitting outer tubular portion 22. The inner tubular opposite surface 26 is formed along a surface orthogonal to the axis O.

Figure 5:
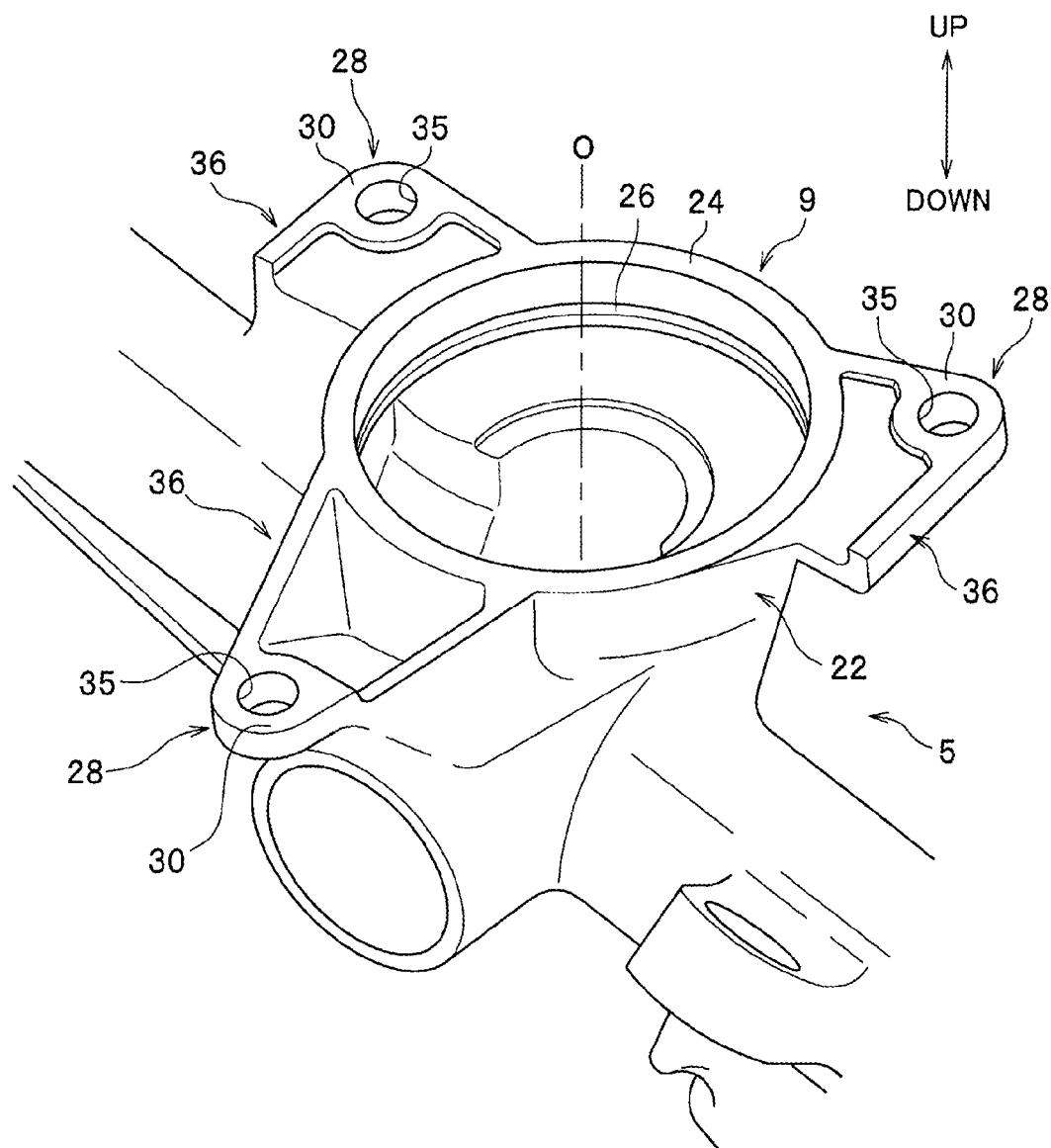
FIG. 5 is a perspective view of the appearance of a second housing.

As depicted in FIG. 5, a plurality of (in the present embodiment, three) the second bolt fastening portions 28 is formed radially outside the fitting outer tubular portion 22 at intervals in a circumferential direction approximately around the axis O. A bolt through-hole 35 along the direction of the axis O is formed in each of the first bolt fastening portions 27. An upper surface of the second bolt fastening portion 28 around the bolt through-hole 35 forms a second bolt aligning surface 30. Each of the first bolt fastening portions 27 is formed on a substantially thin leg seat 36 protruding radially outward from an outer peripheral surface of the fitting outer tubular portion 22. The outer tubular end surface 24 and the second bolt aligning surface 30 are formed on the same plane as each other.

The first housing 8 and second housing 9 configured as described above are fixedly fastened together by fitting the fitting inner tubular portion 21 into the fitting outer tubular portion 22, bringing the first bolt aligning surface 29 into abutting contact with the second bolt aligning surface 30, and screw-threading the bolts 37 into the internal thread holes 33 through the bolt through-holes 35. The interior of the housing 5 is sealed by the seal member 32 interposed between an outer peripheral surface of the fitting inner tubular portion 21 and an inner peripheral surface of the fitting outer tubular portion 22. The present embodiment uses a method of fitting tubular portions, which are the fitting inner tubular portion 21 and the fitting outer tubular portion 22. The reason for this is to precisely center the assist shaft 4 borne across the first housing 8 and the second housing 9.

With the first housing 8 and the second housing 9 fixedly fastened together via the bolts 37, a first gap C1 is provided between the inner tubular end surface 23 and the inner tubular opposite surface 26 in the direction of the axis O, and a second gap C2 is provided between the outer tubular end surface 24 and the outer tubular opposite surface 25 in the in the direction of the axis O. The second gap C2 is formed by positioning the outer tubular end surface 24 on the same plane as the first bolt aligning surface 29 and the second bolt aligning surface 30 and positioning the outer tubular opposite surface 25 above the first bolt aligning surface 29 and the second bolt aligning surface 30.

The second gap C2 may be formed by, for example, positioning the outer tubular opposite surface 25 on the same plane as the first bolt aligning surface 29 and the second bolt aligning surface 30 and positioning the outer tubular end surface 24 below the first bolt aligning surface 29 and the second bolt aligning surface 30. Alternatively, the second gap C2 may be formed by positioning the outer tubular end surface 24 below the first bolt aligning surface 29 and the second bolt aligning surface 30 and positioning the outer tubular opposite surface 25 above the first bolt aligning surface 29 and the second bolt aligning surface 30.

Effects

When the steering wheel 53 is maximally turned with a force or an external force is input through the wheels 57 to move the rack shaft 58 leftward or rightward to bring the rack shaft into abutting contact with a rack stopper not depicted in the drawings, a strong meshing reaction force is exerted between the rack 58A and the pinion 4A. The rack 58A and the pinion 4A are helical gears, and thus, the meshing reaction force causes a thrust load to act on the assist shaft 4. The thrust load is transmitted to the first housing 8 via the first bearing 13.

In this regard, the fitting area between the fitting inner tubular portion 21 and the fitting outer tubular portion 22 is located away from the bolt fastening portions of the first bolt fastening portions 27 and the second bolt fastening portions 28, and in particular, the thin ribs 34 and the leg seats 36 are interposed between the fitting area and the bolt fastening portions. Thus, the fitting area may fail to have high rigidity. In such a case, the thrust load transmitted to the first housing 8 may cause the periphery of the fitting area to be deflected to displace the fitting inner tubular portion 21 and the fitting outer tubular portion 22 with respect to each other in the direction of the axis O. In the related art, when the outer tubular end surface and the outer tubular opposite surface, which are in contact with each other, move to temporarily separate from each other and then to come into contact with each other again, an abnormal sound (stick-slip sound) may occur between the outer tubular end surface and the outer tubular opposite surface as described above. Furthermore, when the outer tubular end surface and the outer tubular opposite surface, which are in contact with each other, undergo a thrust load in a direction in which the surfaces push each other, the seal member such as an O ring may be elastically deformed to displace the fitting inner tubular portion and the fitting outer tubular portion with respect to each other in the radial direction, leading to an abnormal sound (stick-slip sound) generated between the outer tubular end surface and the outer tubular opposite surface, as described above.

Figure 3:
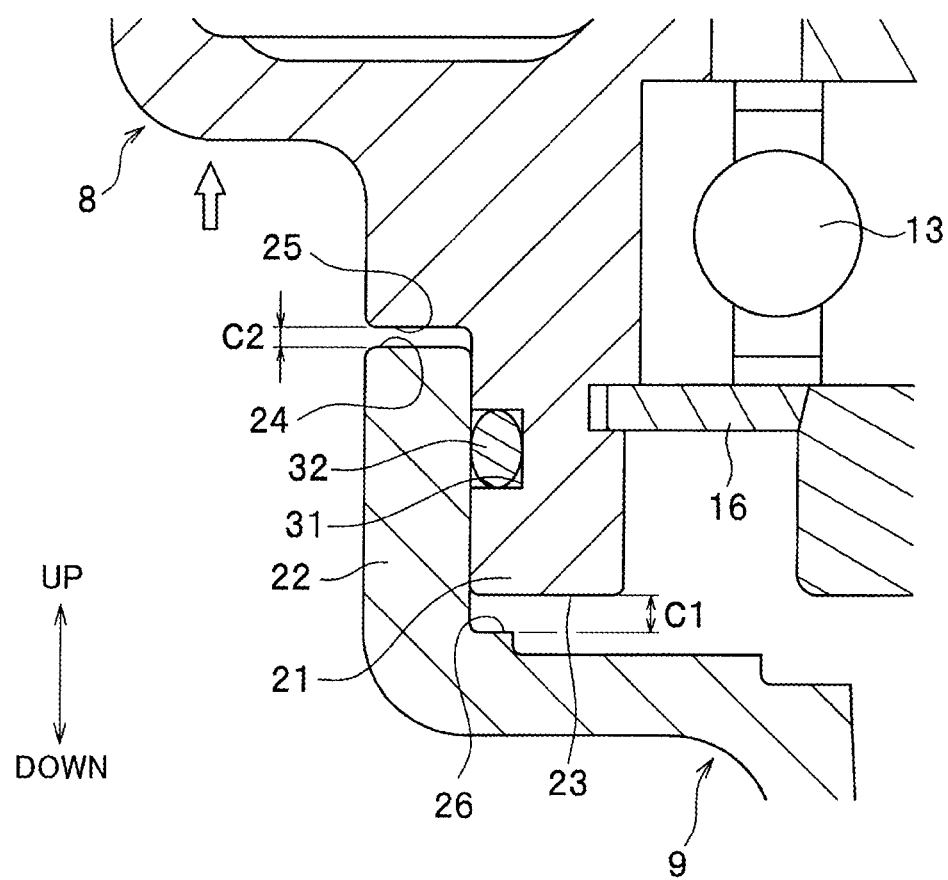
FIG. 3 is a sectional view of a fitting inner tubular portion and a fitting outer tubular portion.

In contrast, in the present invention, the second gap C2 is provided between the outer tubular end surface 24 and the outer tubular opposite surface 25 so as to prevent the outer tubular end surface 24 from coming into contact with the outer tubular opposite surface 25 when the thrust load on the assist shaft 4 causes the fitting inner tubular portion 21 and the fitting outer tubular portion 22 to separate from each other in the direction of the axis O (for example, the first housing 8 moves upward with respect to the second housing 9 as depicted by blank arrows in FIG. 2 and FIG. 3) and then to return to each other again. Similarly, the first gap C1 is provided between the inner tubular end surface 23 and the inner tubular opposite surface 25 so as to prevent the inner tubular end surface 23 from coming into contact with the inner tubular opposite surface 25. This allows avoidance of a possible abnormal sound (stick slip sound) between the fitting inner tubular portion 21 and the fitting outer tubular portion 22.

As a matter of course, even when the thrust load on the assist shaft 4 causes the fitting inner tubular portion 21 and the fitting outer tubular portion 22 to approach each other in the direction of the axis O (for example, the first housing 8 moves downward with respect to the second housing 9), the first gap C1 serves to prevent the inner tubular end surface 23 from coming into contact with the inner tubular opposite surface 26, and the second gap C2 serves to prevent the outer tubular end surface 24 from coming into contact with the outer tubular opposite surface 25. Even when the seal member 32 is elastically deformed to displace the fitting inner tubular portion 21 and the fitting outer tubular portion 22 with respect to each other in the radial direction, the presence of the first gap C1 and the second gap C2 prevents the problem of the abnormal sound (stick slip sound).

Values for the first gap C1 and the second gap C2 are set as needed based on, for example, the maximum set value for a possible thrust load on the assist shaft 4.

The second gap C2 is formed as follows. That is, the second gap C2 can be easily formed in an existing housing structure by positioning the outer tubular opposite surface 25 on the same plane as the first bolt aligning surface 29 and positioning the outer tubular end surface 24 such that the lower end (second end) is closer from the outer tubular end surface 24 than from the second bolt aligning surface 30.

Alternatively, the second gap C2 can also be easily formed in an existing housing structure by positioning the outer tubular end surface 24 on the same plane as the second bolt aligning surface 30 and positioning the outer tubular opposite surface 25 such that the upper end (first end) is closer from the outer tubular opposite surface 25 than from the first bolt aligning surface 29.

As a matter of course, the second gap C2 can also be formed without any problem by positioning the outer tubular end surface 24 such that the lower end is closer from the outer tubular end surface 24 than from the second bolt aligning surface 30 and positioning the outer tubular opposite surface 25 such that the upper end is closer from the outer tubular opposite surface 25 than from the first bolt aligning surface 29.

The preferred embodiment of the present invention has been described. In the described embodiment, the fitting inner tubular portion 21 is formed in the first housing 8 that houses the worm gear mechanism 3, and the fitting outer tubular portion 22 is formed in the second housing 9 that houses the rack shaft 58. However, it is also preferable that the fitting inner tubular portion 21 be formed in the second housing 9 and that the fitting outer tubular portion 22 be formed in the first housing 8.

EXPLANATION OF REFERENCE NUMERALS

1 Electric power steering apparatus
2 Assist motor
3 worm gear mechanism
4 Assist shaft
5 Housing
8 First housing
9 Second housing
21 Fitting inner tubular portion
22 Fitting outer tubular portion
23 Inner tubular end surface
24 Outer tubular end surface
25 Outer tubular opposite surface
26 Inner tubular opposite surface
27 First bolt fastening portion
28 Second bolt fastening portion
29 First bolt aligning surface
30 Second bolt aligning surface
58 Rack shaft
C1 First gap
C2 Second gap

What is claimed is:
1. A housing structure comprising:
a first housing having a fitting inner tubular portion that is formed around an axis of a shaft member and has an inner tubular end surface at a tip of the fitting inner tubular portion, and a first bolt fastening portion that has a first bolt aligning surface formed at a position away from the inner tubular end surface in a radial direction of the shaft member, the first housing supporting a first end side of the shaft member via a first bearing; and a second housing having a fitting outer tubular portion, into which the fitting inner tubular portion is fitted and which has an outer tubular end surface provided at an uppermost end of the fitting outer tubular portion, and a second bolt fastening portion that has a second bolt aligning surface that mates with the first bolt aligning surface, the second housing supporting a second end of the shaft member via a second bearing, wherein a first gap is provided between the inner tubular end surface and an inner tubular opposite surface of the second housing that is positioned opposite to the inner tubular end surface in an axial direction of the shaft member, and a second gap is provided between the outer tubular end surface and an outer tubular opposite surface of the first housing that is positioned to the outer tubular end surface in the axial direction of the shaft member, and when, after a thrust load on the shaft member causes the fitting inner tubular portion and the fitting outer tubular portion to separate from each other in the axial direction of the shaft member, the fitting outer tubular portion return to a position at which the fitting inner tubular portion is fitted into the fitting outer tubular portion, the first gap prevents contact between the inner tubular end surface and the inner tubular opposite surface, and the second gap prevents contact between the outer tubular end surface and the outer tubular opposite surface.

2. The housing structure according to claim 1, wherein the second gap is formed by positioning the outer tubular opposite surface on same plane as the first bolt aligning surface and by positioning the outer tubular end surface so that the second end of the shaft member is closer from the outer tubular end surface than from the second bolt aligning surface.

3. The housing structure according to claim 1, wherein the second gap is formed by positioning the outer tubular end surface on same plane as the second bolt aligning surface and by positioning the outer tubular opposite surface so that the first end of the shaft member is closer from the outer tubular opposite surface than from the first bolt aligning surface.

4. A power steering device comprising the housing structure according to claim 1, wherein the shaft member is an assist shaft to which a worm wheel driven by an assist motor is rotatably attached.

5. A power steering device comprising the housing structure according to claim 2, wherein the shaft member is an assist shaft to which a worm wheel driven by an assist motor is rotatably attached.

6. A power steering device comprising the housing structure according to claim 3, wherein the shaft member is an assist shaft to which a worm wheel driven by an assist motor is rotatably attached.

7. The housing structure according to claim 1, wherein the fitting outer tubular portion has a surface that defines an outermost surface of the second housing in the radial direction.

* * * * *